United States Patent
Balachandran et al.

(10) Patent No.: US 8,111,668 B2
(45) Date of Patent: Feb. 7, 2012

(54) SIGNALING METHODS FOR WIRELESS COMMUNICATION SYSTEMS

(75) Inventors: Krishna Balachandran, Morganville, NJ (US); Arnab Das, Washington, DC (US); Farooq Ullah Khan, Manalapan, NJ (US); Ashwin Sampath, Somerset, NJ (US); Hsuan-Jung Su, Matawan, NJ (US)

(73) Assignee: Alcatel Lucent, Paris (FR)

( * ) Notice: Subject to any disclaimer, the term of this patent is extended or adjusted under 35 U.S.C. 154(b) by 1425 days.

(21) Appl. No.: 10/366,389

(22) Filed: Feb. 14, 2003

(65) Prior Publication Data
US 2004/0160919 A1    Aug. 19, 2004

(51) Int. Cl.
*H04B 7/216* (2006.01)

(52) U.S. Cl. ......... 370/335; 370/342; 370/349; 370/389

(58) Field of Classification Search ............ 370/335, 370/469, 231, 252, 466, 342, 349, 389; 455/512; 714/755
See application file for complete search history.

(56) References Cited

U.S. PATENT DOCUMENTS

| | | | |
|---|---|---|---|
| 6,163,547 A * | 12/2000 | De Vriendt et al. | 370/466 |
| 6,263,466 B1 * | 7/2001 | Hinedi et al. | 714/755 |
| 7,283,482 B2 * | 10/2007 | Koo et al. | 370/252 |
| 7,356,346 B2 * | 4/2008 | Gopalakrishnan et al. | 455/512 |
| 7,551,643 B2 * | 6/2009 | Yeo et al. | 370/469 |
| 2003/0022672 A1 * | 1/2003 | Yoshii et al. | 455/450 |
| 2003/0031119 A1 * | 2/2003 | Kim et al. | 370/200 |
| 2003/0039267 A1 * | 2/2003 | Koo et al. | 370/465 |
| 2003/0039270 A1 * | 2/2003 | Chang et al. | 370/469 |
| 2003/0108013 A1 * | 6/2003 | Hwang et al. | 370/335 |
| 2003/0147371 A1 * | 8/2003 | Choi et al. | 370/341 |
| 2003/0214906 A1 * | 11/2003 | Hu et al. | 370/231 |
| 2004/0013102 A1 * | 1/2004 | Fong et al. | 370/345 |

* cited by examiner

*Primary Examiner* — Hassan Kizou
*Assistant Examiner* — Toan Nguyen
(74) *Attorney, Agent, or Firm* — Harness, Dickey & Pierce, P.L.C.

(57) ABSTRACT

In a wireless communication system, there is a method of generating and transmitting signaling information from a user, where user control information may be appended as a header to a data block, and the data block and header may be encoded and transmitted as a signaling message from the user. In a method of scheduling a user for transmitting information, a signaling message, which may include user control information, is received from a user. A scheduling grant message that may include an allocated data rate may be transmitted in response to the received signaling message. The user control information may include one or more of buffer status information of the user, reverse pilot channel transmit power information and data related to a soft handoff (SHO) status of the user.

20 Claims, 4 Drawing Sheets

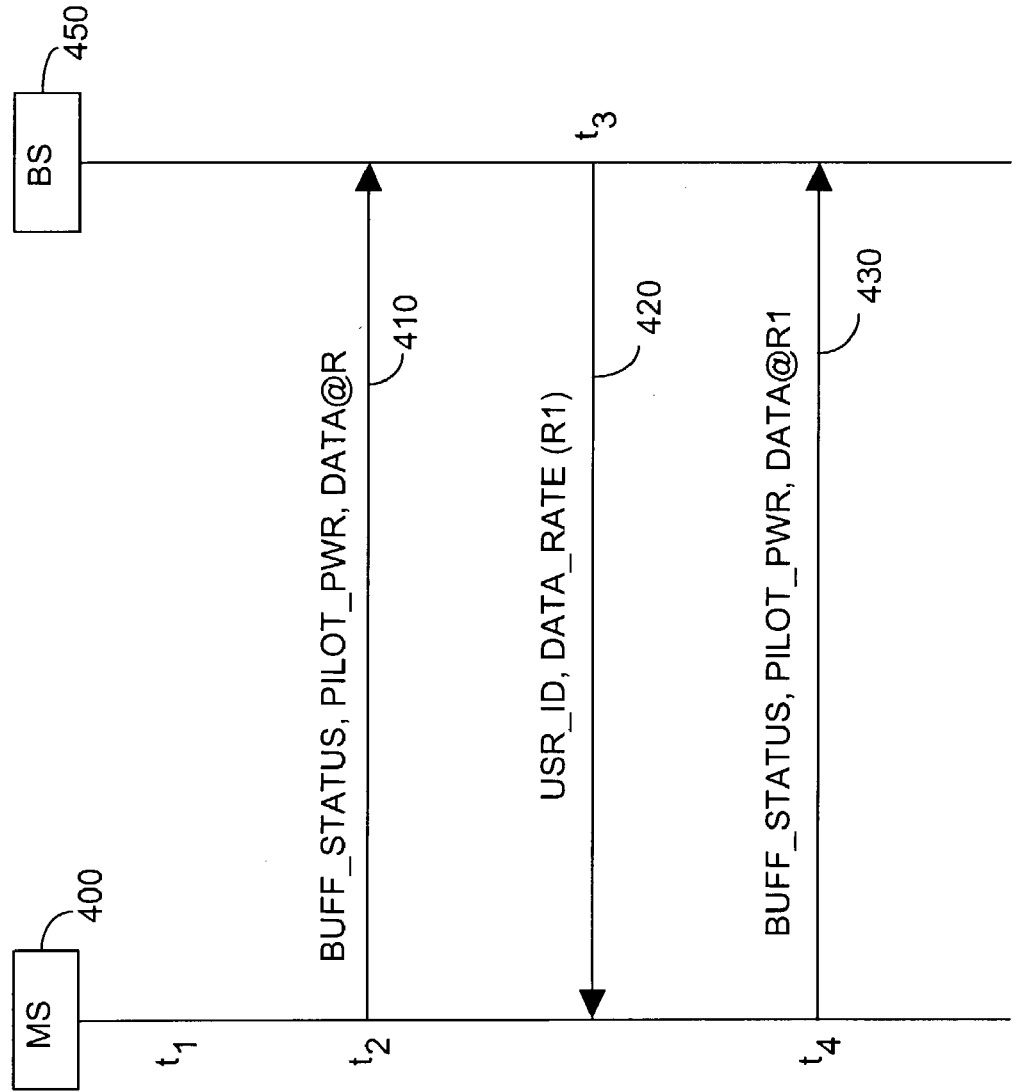

US 8,111,668 B2

SIGNALING METHODS FOR WIRELESS COMMUNICATION SYSTEMS

BACKGROUND OF THE INVENTION

1. Field of the Invention

The present invention relates to methods for generating and transmitting signaling messages in wireless communication systems, and a method for scheduling based on the signaling message.

2. Description of Related Art

Wireless third generation (3G) communication systems are currently introducing technologies in order to become spectrally efficient, while supporting data services, so as to provide improved multiplexing voice and multiplexing data services, for example. These efforts have resulted in the development of the 1xEV-DO and 1xEV-DV standards, an evolution of the CDMA2000 standard from the 3GPP2 body of standards. Similarly, the Universal Mobile Telecommunication System (UMTS) standard has introduced several advanced technologies as part of the High Speed Downlink Packet Access (HSDPA) specification. An aspect in all of these enabling technologies is to ensure that any associated control information is carried in an efficient manner.

Certain advanced or enabling technologies may include scheduling, Adaptive Modulation and Coding (AMC) and Hybrid Automatic Repeat Request (HARQ) technologies. These technologies have been introduced in an effort to improve overall system capacity. In general, a scheduler, such as is present at a base station, selects a user (or mobile station) for transmission at a given time, and adaptive modulation and coding allows selection of the appropriate transport format (modulation and coding) for the current channel conditions seen by the user.

AMC technologies enable a selection of a data rate and a transmission format (i.e., modulation level and channel coding rate) that best "suits" the scheduled user's prevailing channel condition. Delays and measurement errors could result in erroneous selection of a data rate and a transmission format, which could lead to the data transmission, at the selected data rate and transmission format, being received in error. HARQ may be used to recover from such errors.

For example, suppose a block of bits (or a packet) was sent out using QPSK modulation and using a code rate of 0.5, and was received erroneously. A retransmission of that packet takes place, in general, with a new appropriate choice of modulation and may contain a few new "parity" bits from the original set of coded bits. HARQ allows combining of the original transmission with the new transmission, rather than to discard the original transmission. This may greatly improve the probability of correct decoding of the packet. The word "hybrid" in HARQ indicates that Forward Error Correction (FEC) techniques have been used in addition to ARQ techniques. HARQ combining schemes imply that retransmissions are combined with the original unsuccessful transmissions. Accordingly, HARQ helps to ensure that transmissions resulting in unsuccessful decoding, by themselves, are not wasted.

While much of the standardization to date has focused on the forward link (downlink from base station to mobile station), similar enhancements are now being considered for the reverse link. Further evolution of 3G standards include high-speed reverse link packet access (uplink from mobile station to base station). Many of the techniques used in the forward link (i.e., fast scheduling, AMC, HARQ, etc.) may also be usable on the reverse link, so as to improve data rates and system capacity, for example.

In order to enable the above-mentioned technologies, control signaling may be needed on one or both of the reverse link (mobile station to base station) and forward link (base station to mobile station). For example, reverse link data transmission from the mobile station may take place in at least the following modes: (a) a scheduled transmission mode, and (b) an autonomous transmission mode. Typically in a scheduled mode, a central entity such as the base station will decide if a mobile station is scheduled to transmit at a particular instant or not, and, therefore, requires a signaling or schedule grant message from the base station to the mobile station. Such a transfer will be hereafter referred to as a scheduled mode transmission. In (b), the mobile station can autonomously decide when to transmit data or signaling message to the base station.

A scheduled grant message transmitted by the base station to the mobile station may consist of control information such as HARQ parameters, data rate and transmission format. This forward link signaling in HSDPA may be carried over a control channel such as high-speed shared control channel, for example. This control or signaling information in the signaling messages in the forward link may be typically encoded, e.g., with turbo codes, block codes or convolutional codes.

As discussed above, in the reverse link, mobile stations may generally be thought of as being in a scheduled transmission mode or an autonomous transmission mode. In a scheduled transmission mode, the base station decides the time at which a user may transmit in the reverse link, and, additionally, may decide to set some basic rules that should be adhered to by the users, such as rules related to transmission format (e.g., transport format) used to convey data to the base station receiver. Autonomous mode transmissions, on the other hand, can be conducted by the mobile station under some guidelines laid out by the base station or a radio network controller (RNC). For efficient resource utilization, these guidelines may be periodically adjusted by the base station or the RNC through periodic and/or event-triggered forward link signaling. Such triggering events could be embodied as a change in the interference power seen by the base station or a change in the mobile's buffer status, for example.

A scheduler in the base station may also require certain reverse link information from all the mobile stations in a sector. For example, each mobile may signal forward link quality information as seen by the mobile, the buffer status at the mobile, and the mobile's pilot transmit power to the base station. Additionally, the reverse link channel quality can be estimated by the base station by using the mobile's reported pilot transmit power and measuring the mobile's received pilot channel power at the base station. The base station can use all or some of this information to determine the reverse link or forward link scheduling priority of the mobile station, as also the date rate the mobile station can support in a given frame.

Currently, for scheduled mode transmissions, a mobile station may select a data rate and transport format that is different from that commanded by the base station. Therefore, reverse link control information related to the data transmission, such as AMC and HARQ parameters, also should be signaled to the base station. These parameters, along with the buffer size status and the mobile's pilot transmit power, are currently carried on a separate, dedicated physical layer channel from the mobile station to the base station.

Using a separate, dedicated channel, such as a high-speed dedicated physical control channel (HS-DPCCH) for carrying the reverse link control information may have several drawbacks. For example, code space (bandwidth) may be wasted. Additionally, complexity may be increased because the base station has to decode one more channel. Larger overhead may be required, since a cyclic redundancy check code (CRC) and encoder tail bits are needed for a separate control channel. As the data transmission may be decoded only if the related control information is successfully decoded, high power margins may have to be used on the control channels in order to ensure reliability of the control channel information

SUMMARY OF THE INVENTION

In a wireless communication system, there is a method of generating and transmitting signaling information from a user, where user control information may be appended as a header to a data block, and the data block and header may be encoded and transmitted as a signaling message from the user. In a method of scheduling a user for transmitting information, a signaling message, which may include the user control information, is received from a user. A scheduling grant message that may include an allocated data rate may be transmitted in response to the received signaling message. The user control information may include buffer status information, reverse pilot channel transmit power information, and bits related to the soft handoff (SHO) status of the user.

BRIEF DESCRIPTION OF THE DRAWINGS

Exemplary embodiments of the present invention will become more fully understood from the detailed description given hereinbelow and the accompanying drawings, wherein like elements are represented by like reference numerals, which are given by way of illustration only and thus are not limitative of the exemplary embodiments of the present invention and wherein:

FIG. 4 is a timing sequence diagram illustrating transmission of a signaling message and subsequent data transmissions between a mobile station and a base station in accordance an exemplary embodiment of the invention.

DETAILED DESCRIPTION

As used herein, the term "base station" may be synonymous to an access network, system equipment or Node-B, for example, each term of which may describe equipment that provides data connectivity between a packet switched data network (PSDN) such as the Internet, and one or more mobile stations. Additionally, the term "mobile station" where used herein, may be equivalent to a user, user equipment (UE), mobile and remote station, and may describe a remote user of wireless resources in a wireless communication network or a device providing data connectivity to a user, for example.

In accordance with the exemplary embodiments of the invention, and to enable channel quality sensitive scheduling and data rate selection (AMC) on the reverse link, the base station should be aware of the reverse link quality of all the users in the sector. The reverse link channel quality can be estimated by using the mobile's reported pilot transmit power and upon measuring the mobile station's received pilot channel power at the base station. The exemplary embodiments of the present invention are directed to methods for periodically signaling the base station such that the reverse pilot channel transmit power is known to the base station. The base station may then estimate the reverse link channel quality by using a most recently received reverse pilot channel transmit power Additionally, a scheduler in the base station should have knowledge of the mobile station's data buffer size in order to determine an efficient data rate that the mobile station can support in a given frame. The buffer information may also be used in determining the scheduling priority for the mobile. Accordingly, the exemplary embodiments of the present invention are directed to methods for periodically signaling the base station such that the mobile station's buffer size or capacity is known to the base station, in addition to reverse pilot channel transmit power.

Figure 1:
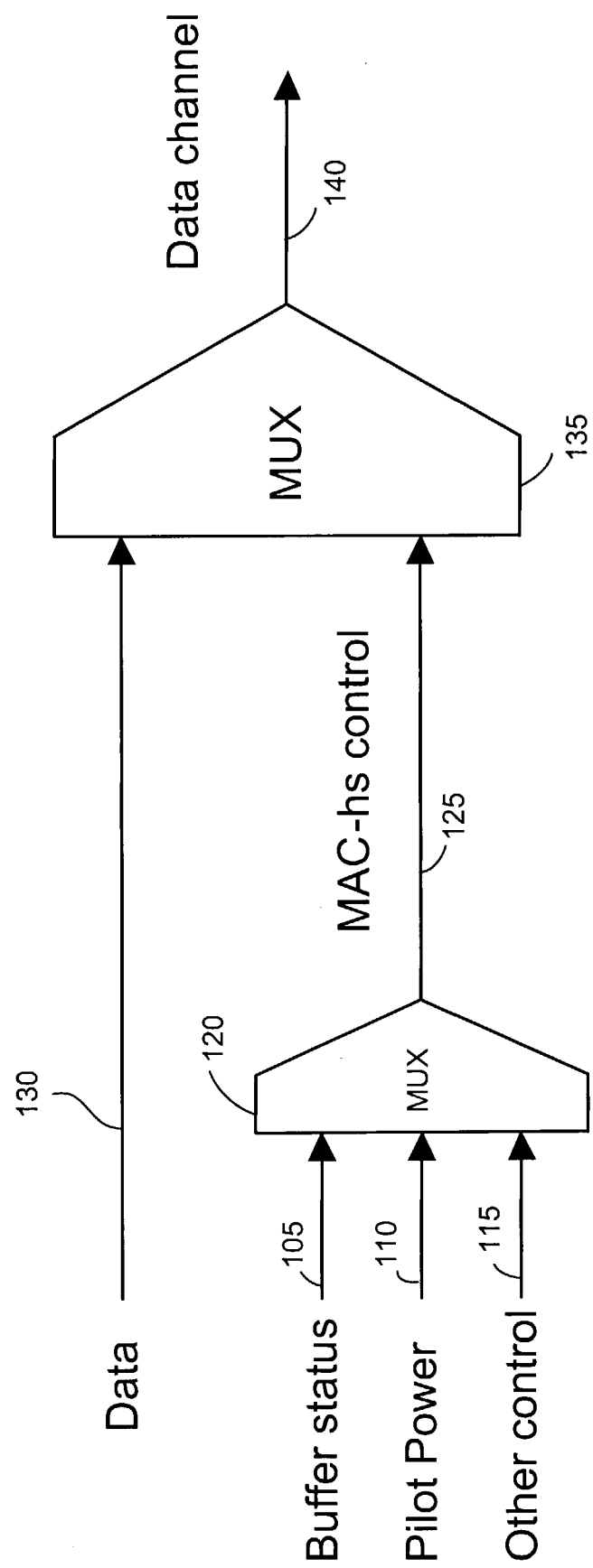
FIG. 1 illustrates an exemplary embodiment of the invention in the context of multiplexing reverse link control information with data in a data channel.

FIG. 1 illustrates an exemplary embodiment of the invention in the context of multiplexing reverse link control information with data in a data channel. In accordance with the exemplary embodiments of the invention, problems encountered in the prior art may be solved using one or both of the following.

Firstly, while in scheduled mode, a mobile station almost always uses the control parameters commanded by the base station. These control parameters may be HARQ parameters, AMC parameters, data rate commands, redundancy parameters, etc. Additionally, the base station may also signal parameters related to the transmit power that should be used by the mobile station for transmission. Therefore, since the base station maintains "control", such that the mobile station may exactly follow commanded control parameters, the mobile station may only need to transmit its buffer status and pilot power information as "reverse link control information". In other word, the "other" control information described above may not need to be transmitted to the base station. This may significantly reduce overhead.

However, if the mobile station receives simultaneous (conflicting) scheduling commands from multiple base stations, such as may arise when the mobile is in soft handoff (SHO), where the mobile has an active link with multiple uncoordinated base stations, then in addition to buffer status and pilot power, the mobile may transmit other control information, i.e., HARQ parameters, AMC parameters, data rate commands, redundancy parameters, etc.

The reverse link control information may also include one or more bits indicating the SHO status. These bit(s) indicate to the base stations whether the mobile station is in SHO or not, i.e., whether the mobile station has a multiplicity of active links with uncoordinated base stations. This information may enable the base stations to determine whether or not to schedule the mobile station when it is in SHO.

Secondly, and as shown in FIG. 1, when the mobile station is in autonomous mode, such as was described in the above case with conflicting scheduling commands, which may cause a mobile station to "override" one base station's control parameters in favor of another base station's control parameters, for example, reverse link control information may be sent with data over a single channel, instead of over a separate dedicated control channel.

The user control information may include buffer status information 105, reverse pilot channel transmit power information 110 and, if necessary, other control information 115. In an exemplary embodiment, the other control information 115 may include a sequence number of the packet and SHO bits indicating the SHO status of the mobile station, for example. This data at 105, 110 and 115 may be multiplexed at multiplexer 120 to form medium access control high speed (MAC-hs) control data 125. The MAC-hs control data 125 may be multiplexed with data 130 at another multiplexer 135 to provide data 140, which is the combination of data 130 and MAC-hs control data 125, and which may be carried in a single channel, such as a reverse traffic channel, for example. Data 130 may include traffic data related to a transfer of data, such as transfer of contents from a web page in an upload to the internet/download from the internet, etc., for example. This may enable use of only one dedicated channel for transmitting both the data and reverse link control information, in the form of a signaling message, for example, over a single channel to the base station.

Figure 2:
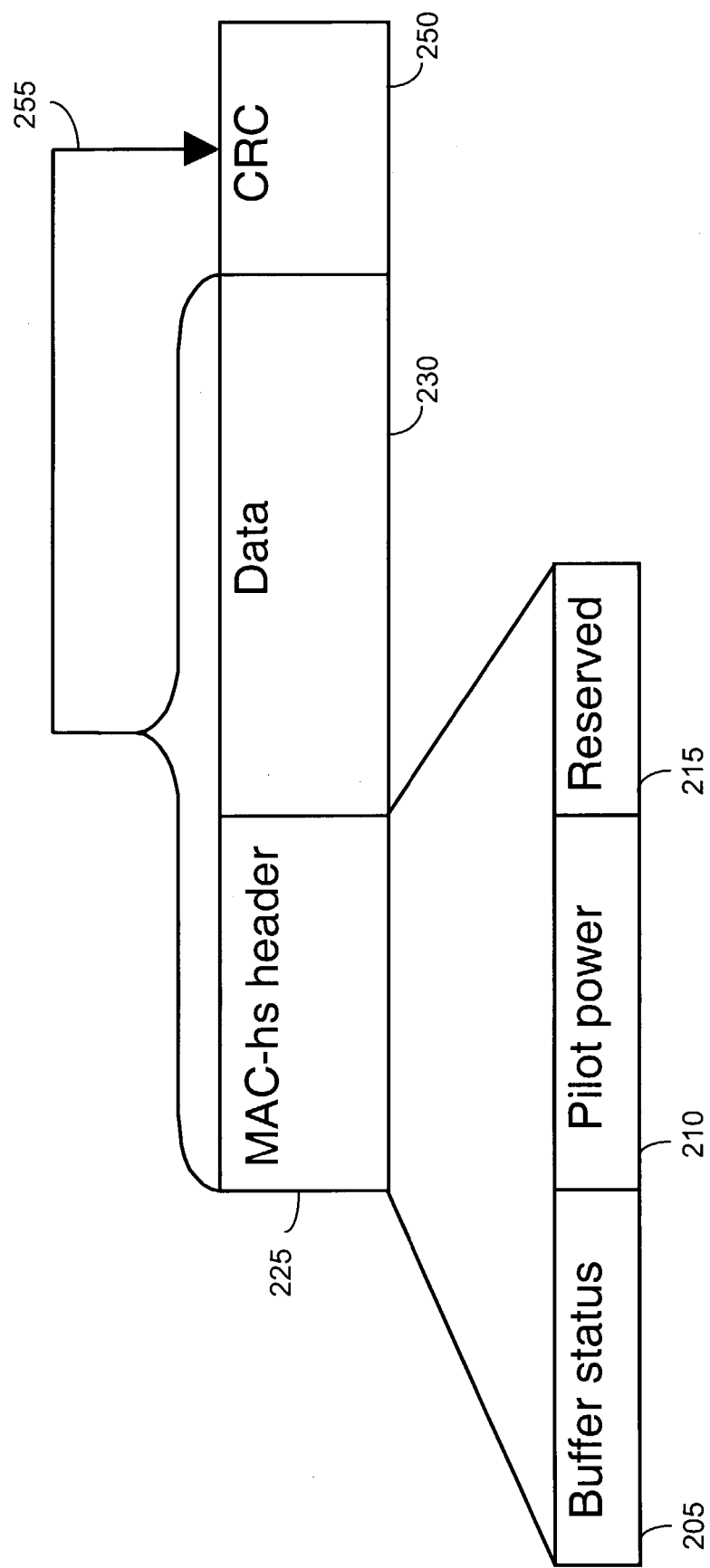
FIG. 2 illustrates an exemplary embodiment of the invention in the context of appending a MAC-hs header segment and a CRC segment to a data information block.

FIG. 2 illustrates an exemplary embodiment of the invention in the context of appending a MAC-hs header segment and a CRC segment to a data information block. The MAC-hs control data 125, containing reverse link control information such as a buffer status field 205, pilot power field 210 and a reserved field 215 that may contain bits reserved for other control information 115, for example, may be embodied as a header. This header may be called a medium access control high speed (MAC-hs) header 225, for example, and may be appended to the data 130, which is embodied as a data information block 230 in FIG. 2. Additionally, a single cyclic redundancy check code (CRC) segment 250, calculated over the MAC-hs header 225 and the data block 230 (see arrow 255) may be appended to the resulting block. The CRC segment 250 may have a 16-bit length, for example, and is a frame quality indicator that may be used for error detection, as most networking protocols use CRCs to verify data received is the same as the data that was sent.

Figure 3:
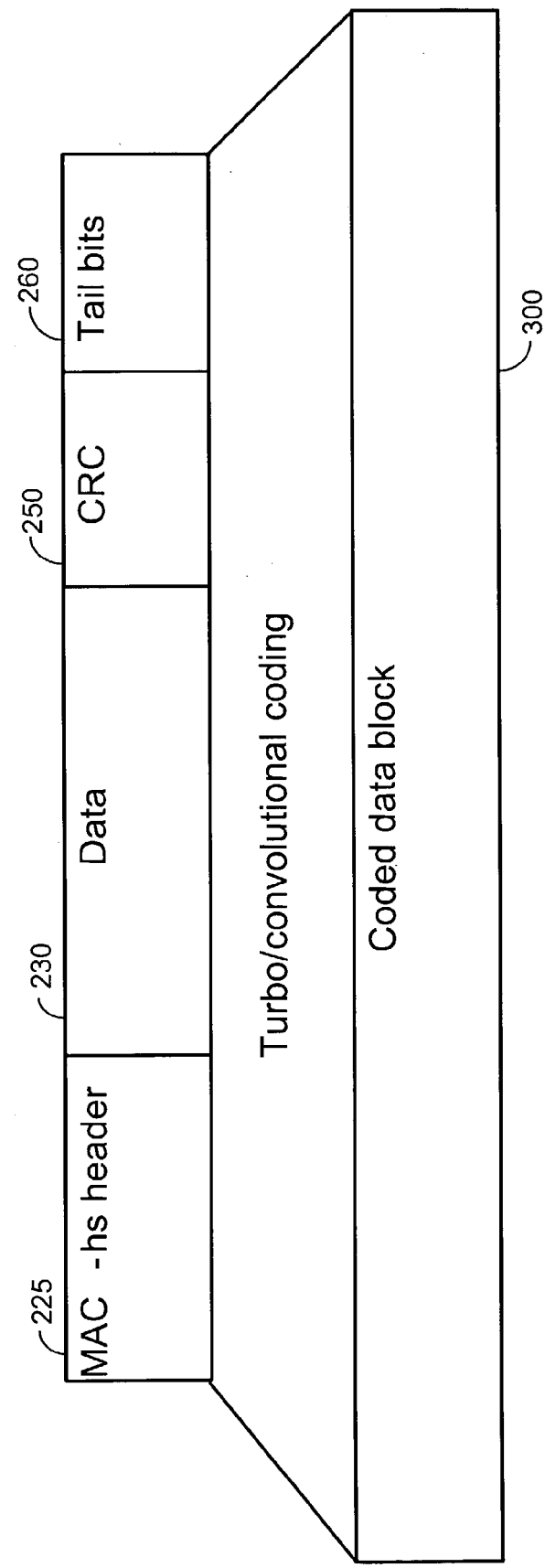
FIG. 3 illustrates an exemplary embodiment of the invention illustrating encoded of a data information block with appended segments to form a coded data block.

FIG. 3 illustrates an exemplary embodiment of the invention illustrating encoding of a data information block with appended segments to form a coded data block. Once the CRC and header segments 250, 225 have been appended, an encoder such as a turbo encoder, for example, may encode data block 230, frame quality indicator (CRC segment 250), MAC-hs header 225 and any reserved bits. During encoding, an encoder output tail sequence, or a tail bits segment 260, may be added, so that a coded data block 300 is prepared for transmission.

FIG. 4 is a timing sequence diagram illustrating transmission of a signaling message and subsequent data transmissions between a mobile station and a base station in accordance an exemplary embodiment of the invention. In this example, the mobile station 400 has already registered with the wireless communication system and is in an active state.

Referring now to FIG. 4, at time $t_1$, the coded data block 300 may arrive in the mobile station 400's buffers. At time $t_2$, the mobile station 400 performs an autonomous transmission (un-prompted or not scheduled) at a given data rate R that is known to the base station 450. In this autonomous transmission, shown by line segment 410, the mobile station 400 may send one or more of its buffer status, reverse pilot channel transmit power level and SHO status in the MAC-hs header 225 as part of the coded data block 300. In the exemplary embodiment of FIG. 4, mobile station 400 is shown sending its buffer status and reverse pilot channel transmit power level. This may be stored by a receiving base station 450, which updates the current information regarding mobile station 400 buffer status and reverse pilot channel transmit power with the new information.

Upon receiving the buffer status and pilot transmit power information, the base station 450 may decide to schedule the mobile station 400, sending a scheduling grant (shown by line segment 420) at time $t_3$. The mobile station 400 may continue transmitting in the autonomous mode while waiting for the scheduling grant message 420 from the base station 450. The scheduling grant message 420 may contain a user identifier (ID) for the mobile station 400 and other control parameters, such as an allocated data rate (R1 for example) for the mobile station 400, HARQ feedback, AMC, redundancy data, etc.

At a scheduled time ($t_4$), the mobile station 400 may transmit data (indicated by line segment 430) at the allocated data rate R1. In this data transmission 430, buffer status and reverse pilot channel transmit power information may be carried in each coded data block 300 transmitted to the base station 450. Thus, the base station 450 receives at least one of updated buffer status, reverse pilot channel transmit power information and SHO status of the mobile every time the mobile station 400 transmits to the base station 450, regardless if it is done autonomously, or in response to a scheduling grant received from the base station 450.

For periods in between successive periodic or aperiodic data transmissions by the mobile station 400, which includes one or more of the buffer status, pilot power information, and SHO data, the base station 450 may estimate the reverse pilot channel transmit power by tracking the previous power control commands transmitted by the base station 450 to the mobile station 400, for example. This may enable the base station 450 to project what the mobile station 400's pilot power may be at any given instant in time between periodic or aperiodic autonomous transmissions by mobile station 400, for example.

If the mobile station 400 has not transmitted any data for a substantial period of time, such as several tens of milliseconds, for example, then the base station 450's estimate of the pilot power being used by the mobile may be outdated or erroneous. This could affect scheduling and data rate selection by the base station 450. In order to update this information, the base station 450 may simply schedule the mobile station 400 periodically in order to obtain up-to-date information of the mobile station 400's pilot power and buffer status, for example. Alternately, the mobile station 400 may also periodically transmit this information to the base station 450 without being explicit, with a period that is known to the base station 450. These periodic transmissions may or may not accompany a data transmission 230.

The exemplary embodiments of the present invention may provide several benefits. For example, transmission of signaling message or information may be effected with greater efficiency, as there may be no need for separate dedicated control channels for carrying the reverse link control information. Complexities may be reduced, as the base station only needs to decode a single data channel, and data transmissions by the mobile station in response to scheduled grant messages sent by the base station may always use the control parameters signaled by the base station.

The exemplary embodiments of the present invention being thus described, it will be obvious that the same may be varied in many ways. Such variations are not to be regarded as a departure from the spirit and scope of the exemplary embodiments of the invention, and all such modifications as would be obvious to one skilled in the art are intended to be included within the scope of the following claims.

What is claimed is:

1. A method of transmitting signaling information from a user, comprising appending user control information as a header to a data block, the contents of the user control information being unrelated to the contents of the data block, the user control information including at least one of buffer status of the user, reverse pilot channel transmit power and data related to soft handoff status of the user, the user control information being used to determine one of a transmission format, a scheduling priority and a transmission power;
encoding the data block and header; and
transmitting the encoded header and data block as a signaling message from the user.

2. The method of claim 1, wherein said appending further includes:
first multiplexing said user control information to form a medium access control high speed (MAC-hs) header; and
second multiplexing said MAC-hs header with said data block.

3. The method of claim 1, wherein said user control information includes other control information selected from at least one or more of Hybrid Automatic Repeat Request (HARQ) parameters, adaptive modulation and coding (AMC) parameters and data rates allocated from one or more base stations.

4. The method of claim 1, wherein said transmitting is performed autonomously.

5. The method of claim 1, wherein said transmitting is performed autonomously by the user at periodic or aperiodic intervals, and a period of said periodic intervals is known to one or more receiving base stations.

6. The method of claim 1, further comprising:
receiving a scheduling grant message that includes an allocated data rate in response to said transmitted signaling message; and
transmitting information at the allocated data rate.

7. The method of claim 6, wherein said information transmitted at the allocated data rate includes said user control information.

8. The method of claim 1, wherein said data block includes traffic data related to a data transfer.

9. The method of claim 1, wherein the user control information includes one or more bits indicating the data related to soft handoff status of the user.

10. The method of claim 1, wherein the user control information includes the buffer status of the user and the data related to soft handoff status of the user.

11. A method of transmitting signaling information from a user, comprising:
multiplexing a header segment with a data block, said header segment containing multiplexed control information including at least one of buffer status of the user, reverse pilot channel transmit power and data related to soft handoff status of the user, the contents of the header being unrelated to the contents of the data block, the user control information being used to determine one of a transmission format, a scheduling priority and a transmission power;
encoding said data block with the header; and
transmitting the encoded header and data block, on one single data channel, as a signaling message from the user.

12. A method of scheduling a user for transmitting information, comprising:
receiving a transmitted signaling message from a user over one communication channel, the signaling message including user control information appended as a header to data, the contents of the user control information being unrelated to the contents of the data being received over the one communication channel, the user control information being used to determine one of a transmission format, a scheduling priority and a transmission power; and
transmitting a scheduling grant message that includes an allocated data rate in response to said received signaling message
wherein said user control information includes at least one of buffer status of the user, reverse pilot channel transmit power and data related to soft handoff status of the user.

13. The method of claim 12 further comprising:
updating at least one of a stored buffer status, pilot channel information and soft handoff status of the user using the received control information.

14. The method of claim 13, wherein said signaling message is received at periodic or aperiodic intervals, and a period of said periodic intervals is known to one or more receiving base stations.

15. The method of claim 14, further comprising: estimating the reverse pilot channel transmit power of the user between said periodic or aperiodic intervals based on previous power control commands sent to the user.

16. The method of claim 12, further comprising:
receiving information at the allocated data rate; and
updating at least one of a stored buffer status, pilot channel information and soft handoff status of the user using the received control information.

17. A method of generating a signaling message for transmission by a user over one data channel in a communications system, comprising:
forming a signaling message to include a data block and user control information, the contents of the user control information being unrelated to the contents of the data block, the user control information being used to determine one of a transmission format, a scheduling priority and a transmission power; and
encoding the signaling message for transmission,
wherein said user control information includes at least one of buffer status of the user, reverse pilot channel transmit power and data related to soft handoff status of the user.

18. The method of claim 17, wherein said forming further includes:
first multiplexing said user control information to form a medium access control high speed (MAC-hs) control data header; and
second multiplexing said MAC-hs header data with data of said data block.

19. The method of claim 18, further comprising: appending a cyclic redundancy code (CRC) segment to said data block and header of said signaling message, wherein said encoding adds a tail bits segment to said signaling message.

20. A method of generating a signaling message for transmission by a user over a single channel in a wireless communications system, comprising: appending a header segment to a data block, the contents of the header segment being unrelated to the contents of the data block, the signaling message including user control information being used to determine one of a transmission format, a scheduling priority and a transmission power, the header segment including at least one of buffer status of the user, reverse pilot channel transmit power and data related to soft handoff status of the user; and
encoding said data block with said appended header segment for transmission.

* * * * *